No. 673,781. Patented May 7, 1901.
P. S. McCROSKEY.
CHEESE CUTTER.
(Application filed Aug. 25, 1900.)
(No Model.) 4 Sheets—Sheet 1.
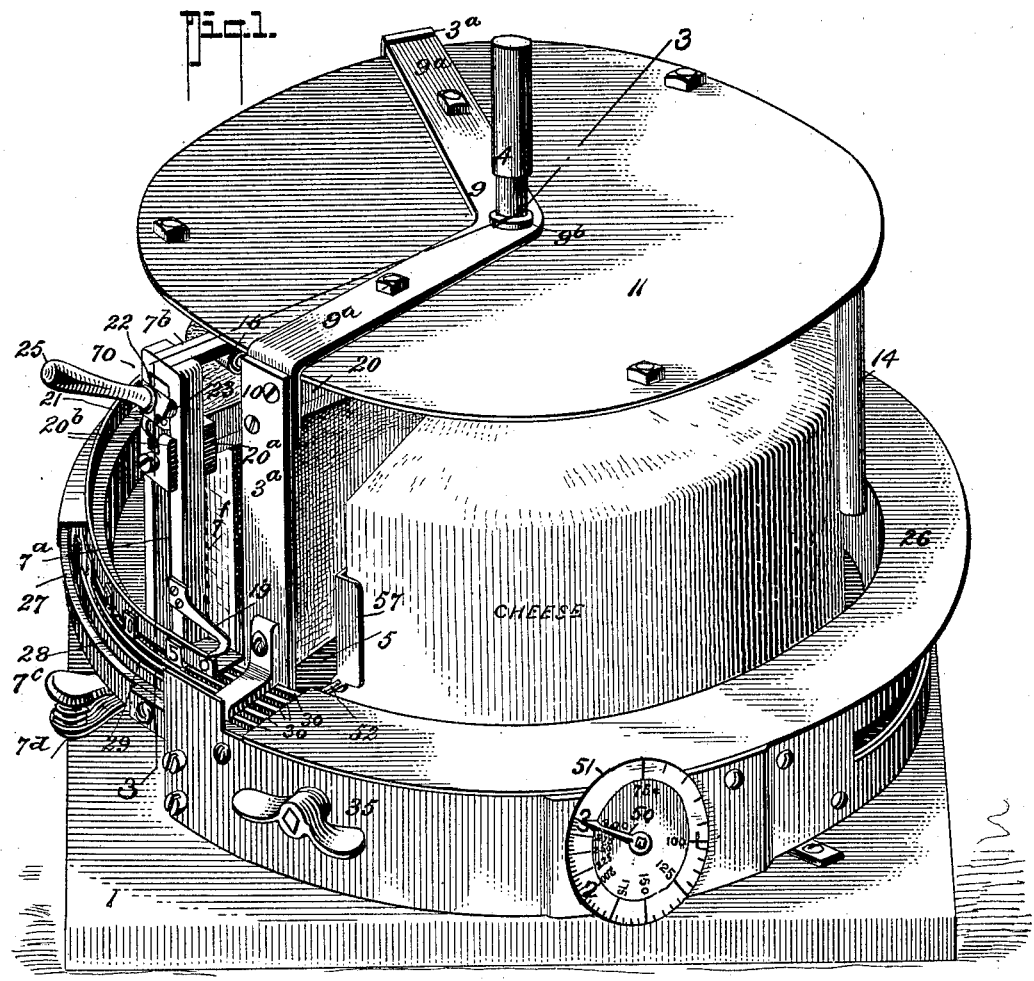
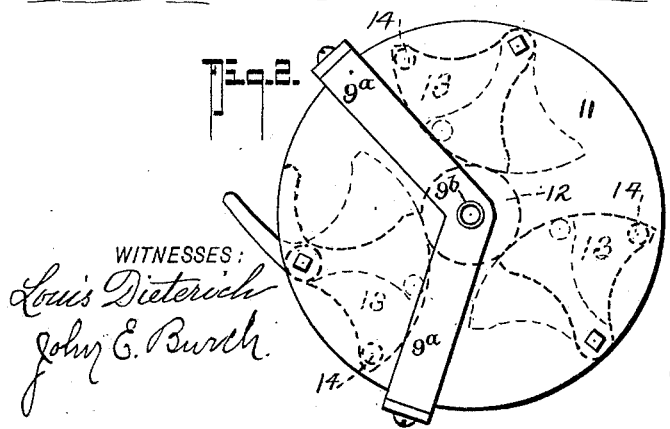
WITNESSES:
Louis Dieterich
John E. Burch
INVENTOR
P. S. McCroskey
BY
Fred G. Dieterich & Co.
ATTORNEYS
THE NORRIS PETERS CO., PHOTO-LITHO., WASHINGTON, D. C.

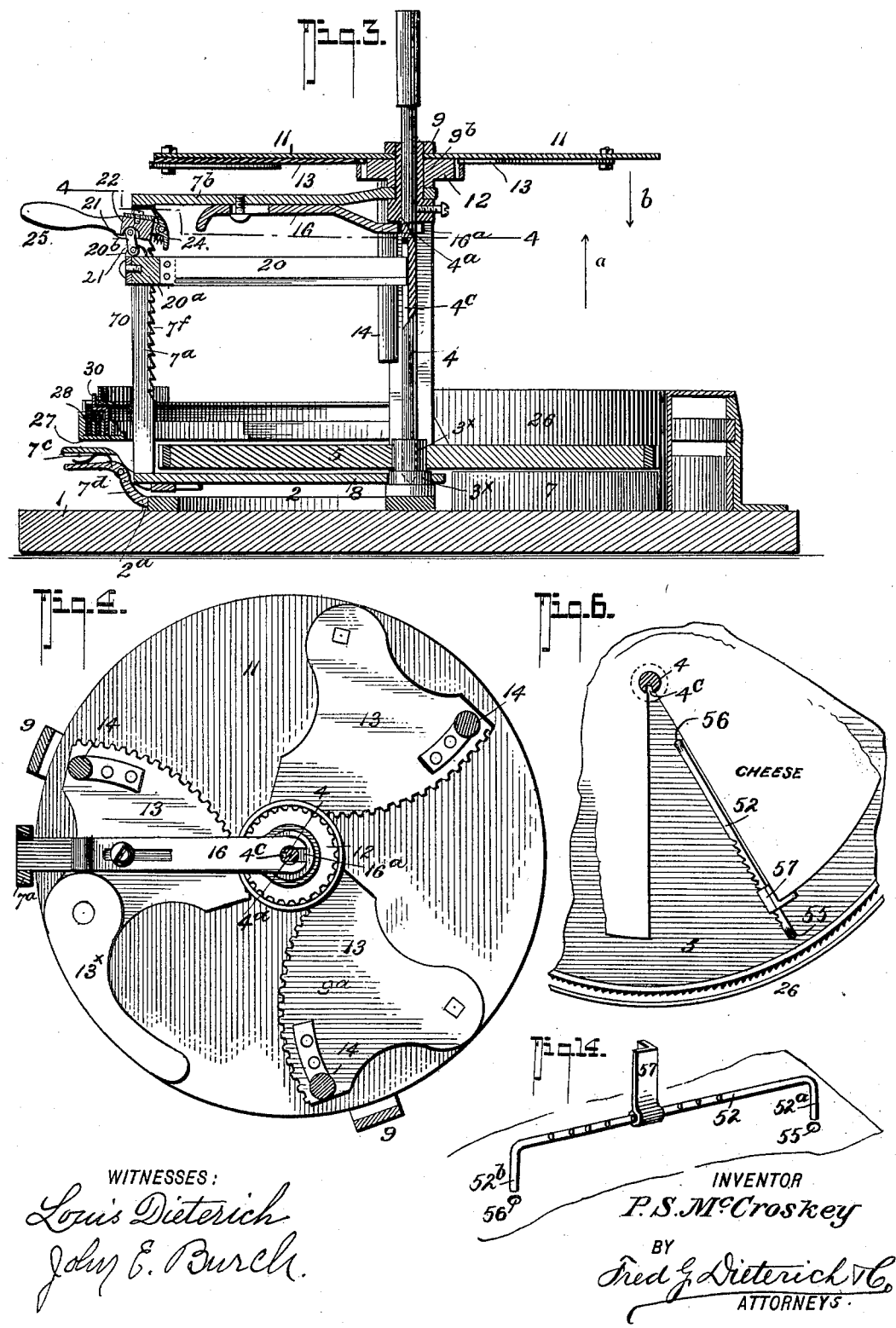

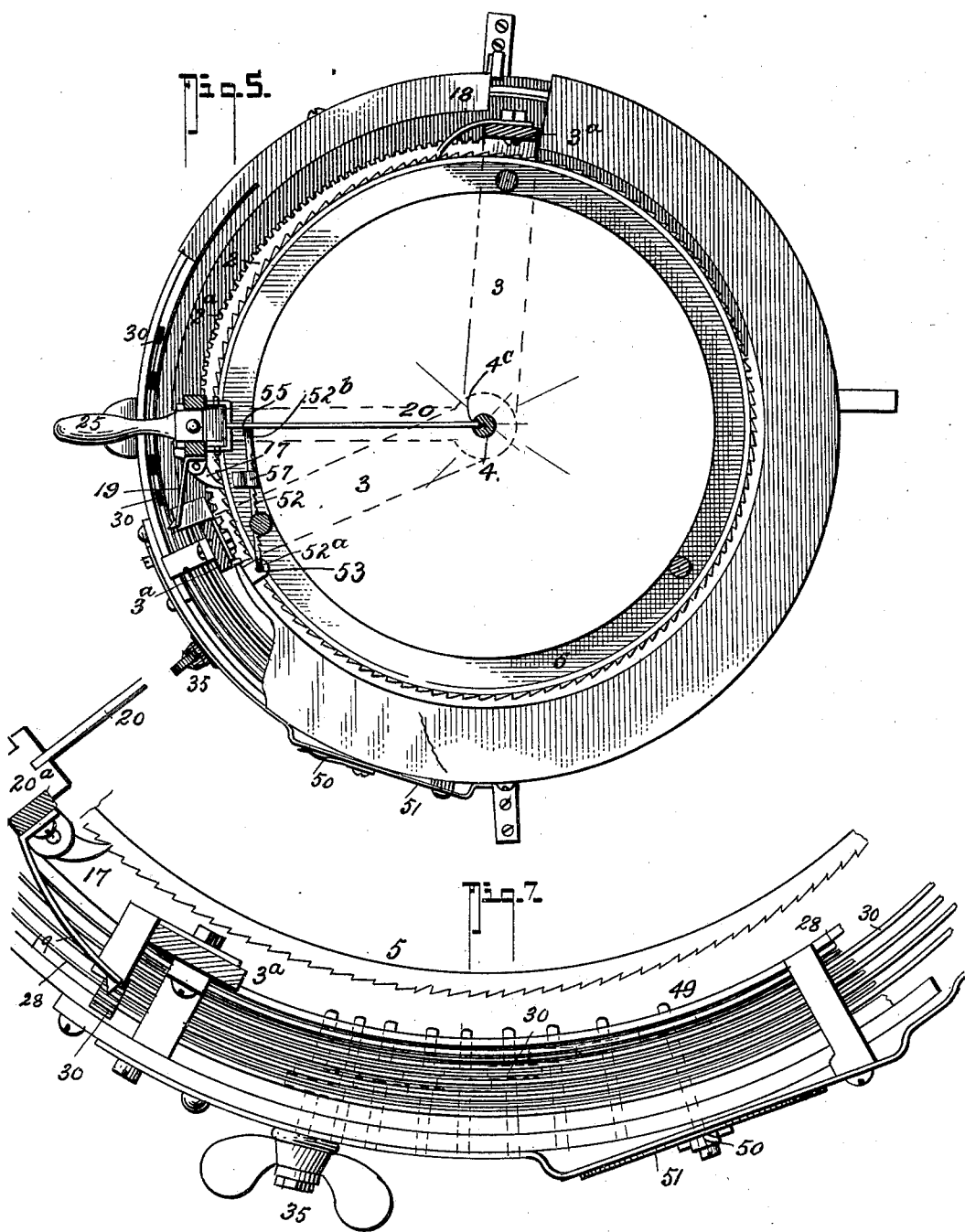

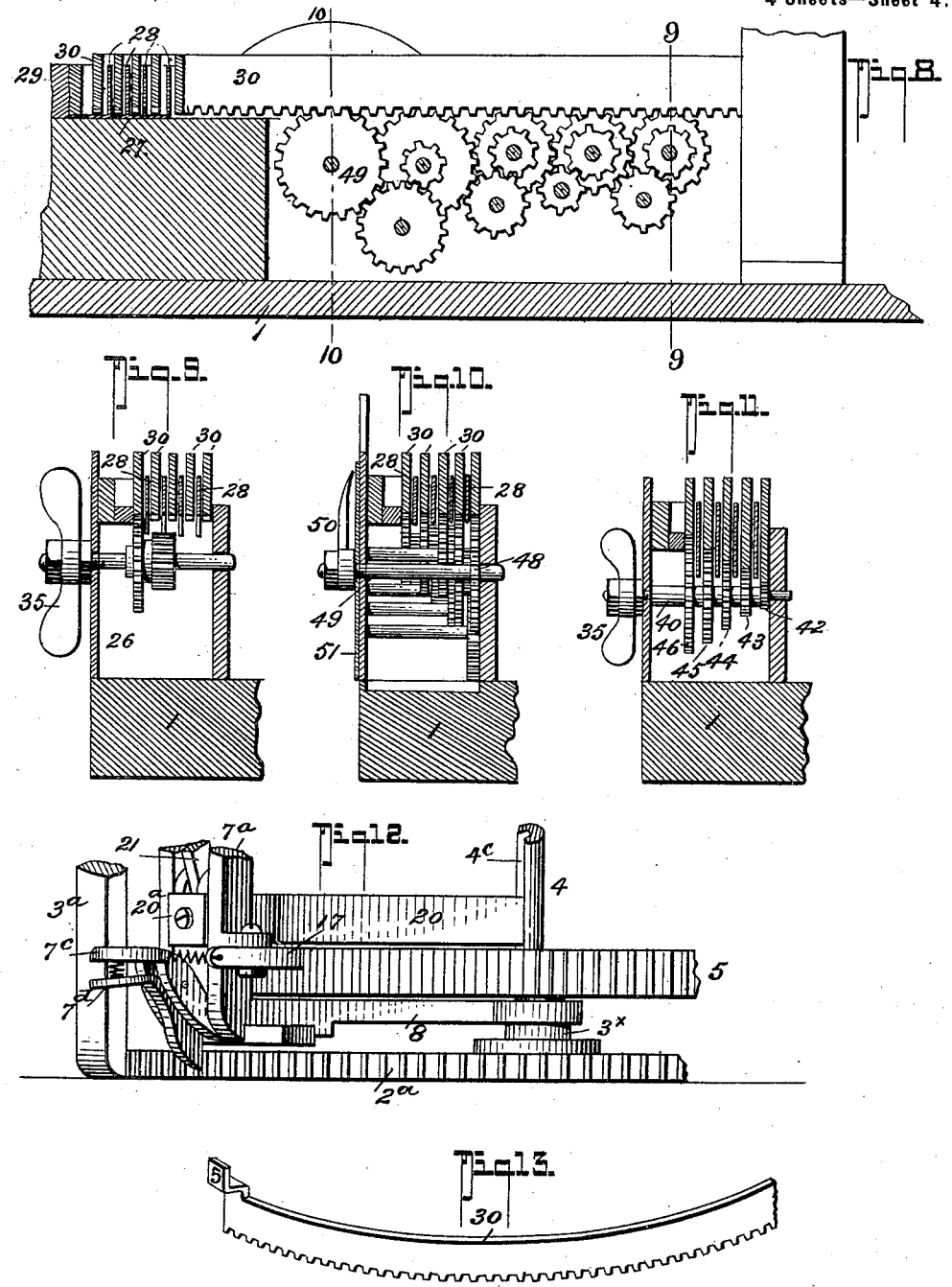

UNITED STATES PATENT OFFICE.

PHILIP S. McCROSKEY, OF LOGAN, KANSAS.

CHEESE-CUTTER.

SPECIFICATION forming part of Letters Patent No. 673,781, dated May 7, 1901.

Application filed August 25, 1900. Serial No. 28,058. (No model.)

*To all whom it may concern:*

Be it known that I, PHILIP S. MCCROSKEY, residing at Logan, in the county of Phillips and State of Kansas, have invented a new and Improved Cheese-Cutter, of which the following is a specification.

This invention relates to improvements in that type of cheese-cutters having a suitable supporting-base, a cutter, gage devices, and means for adjustably setting the said devices, whereby to regulate the quantity or size of the slice to be cut.

Primarily this invention seeks to provide a cheese holder and cutter of the character described particularly arranged for cutting the cheese into slices of a predetermined value—for example, five-cent slices or multiples thereof, instead of pounds and ounces, as is usual—and generically it comprehends a novel means for setting the gage devices indicating five, ten, fifteen, twenty, and twenty-five cent cuts relatively to such positions as the gross value of the cheese may make necessary.

This invention also includes in its complete make-up a novel construction of cutting mechanism coöperatively arranged with a rotary cheese carrier or holder in such manner that when the cutter is returned to its normal position the cheese will be properly moved to bring it in position for the next cut, a cheese-centering means also forming a component part of my invention, said means being easily manipulated, whereby to bring the cheese in a proper position upon the carrier or holder so its circumferential edge will be so held as to effect a proper operation of the cutting mechanism.

My invention also comprises among its characteristic features simplicity of construction, ease of operation, and the no less desirable quality of providing a cheese holding and cutting means capable of receiving cheeses of different sizes and in which the cutter-setting-gage devices can be set for cutting up the cheese in the proper slices of a predetermined value—in other words, in which the gage devices can be adjusted correspondingly to the gross value of the cheese.

In its more subordinate features my invention consists in certain details of construction and novel arrangement of parts, all of which will be first described in detail and then specifically pointed out in the appended claims, reference being had to the accompanying drawings, in which—

Figure 1 is a perspective view of my improved cheese holder and cutter. Fig. 2 is a top plan view of the same, the adjustment of the cheese-centering device being shown in dotted lines, the combined center rod and knife-guide being removed. Fig. 3 is a cross-section of the same, taken substantially on the line 3 3 of Fig. 1, with the center rod and knife-guide in place. Fig. 4 is a horizontal section taken on the line 4 4 of Fig. 3 looking in the direction of the arrow *a*. Fig. 5 is a similar view looking in the direction of the arrow *b*, the base or platform being at its initial position, the device for holding the platform from rotating being also in its initial or locking position. Fig. 6 is a diagrammatical plan view illustrating the position of the locking devices after the first slice has been cut from the cheese, said devices now forming a clamp for engaging one of the cut edges of the cheese. Fig. 7 is an enlarged plan view of that part of the appliance having the gages and gage-setting mechanism. Fig. 8 is a rear elevation, partly in section, of such parts. Fig. 9 is a section on the line 9 9 of Fig. 8. Fig. 10 is a similar view taken on the line 10 10 of Fig. 8. Fig. 11 is a section of a modified form of gear devices, taken practically on the line 9 9 of Fig. 8. Fig. 12 is a detail view, parts being in section, illustrating the cutter-setting devices and their connection with the rotary base and cheese-carrier; and Fig. 13 is a perspective view of one of the gage-plates detached. Fig. 14 is a detail view of the detent device for engaging the cut edge of the cheese.

Referring now to the accompanying drawings, in which like numerals represent like parts in all the figures, 1 designates a suitable base, upon which is secured a segmental plate 2, having a serrated or toothed periphery, as indicated at 2ª, the purpose of which will hereinafter appear.

Upon the bottom 1 is secured a metal piece consisting of two radially-projecting arms 3 3, the ends of which are bent up at right angles to form vertical standards 3ª, said piece also having an upwardly-projecting central socket $3^{\times}$, which receives the lower end of the combined center rod and knife-guide 4, said socket $3^{\times}$ also forming a central bearing, upon which the base or cheese-carrier platform 5 rotates, said carrier being held steady in its rotary action by reason of its resting at one side on the annular flange 7, projecting up from the base, and the arm 8, hereinafter again referred to.

9 indicates a metal member having radial arms $9^a$ $9^a$, which terminate in pendent portions arranged to engage the upper ends of the standards $3^a$, to which they are secured by the nuts and bolts 10. The member 9 also has a pendent hollow hub $9^b$, which extends over the hub $3^{\times}$ on the lower metal piece to the said hub $9^b$, passing through the sheet-metal circular top plate 11, made fast to the under side of the arms $9^a$, and upon the said hub $9^b$ is held a rotatable gear 12, with which a number of segmental rack members 13 engage, each of which is pivotally secured to the under side of plate 11 to swing in a horizontal plane, as best shown in Fig. 4, by reference to which it will be observed the members 13 are so pivoted and held to engage the pinion 12 in such manner that when any one of the said members 13 is swung upon its pivot the others, by the rotary motion of the pinion 12, will move in unison therewith. Each member 13 has a pendent leg 14 at one corner, which extends down below the top of the cheese to engage the sides thereof, and one of the members 13 has an extended handle $13^{\times}$, which is so curved that when it is turned in to its normal position it will lie under the top plate 11, as clearly shown in the drawings.

It will be seen in Fig. 2, should the handle $3^{\times}$ be turned out in the direction indicated by the arrow, the members 13 will swing in a direction to bring their pendent legs 14 toward the center or axial line of the cheese-carrier 5 and in consequence they will move the cheese in such manner as to bring it in a proper central position. After being thus set the cheese is held in a steady position by the center rod and guide member 4, which is slipped down through the hollow socket $9^b$ through the center of the cheese, its lower end seating in the bottom socket $3^{\times}$. After the member 4 is inserted the members 13 are swung back to their normal position.

70 designates a swinging knife-carrying frame comprising a bottom arm 8, a vertically-slotted standard $7^a$, and an upper inwardly-extending arm $7^b$, which lies in a plane over the bottom arm 8, the said arms 8 and $7^b$ being respectively fulcrumed on the lower socket $3^{\times}$ and the upper pendent hub $9^b$, such arrangement of parts providing for swinging the knife-carrier in the arc of a circle, the reason of which will presently appear. The outer end of the arm 8 is held to travel over the segmental guide 2, and to the said outer end is connected a thumb-piece $7^c$, having a spring-pawl $7^d$, which engages the serrated or tooth edge of the member 2.

Upon the upper arm $7^b$ is slidably held a latch 16, having a bifurcated end $16^a$ to engage the squared portion $4^a$ of the rod 4, said latch having for its purpose to hold the rod 4 from turning and also from working up out of its lower socket-bearing.

17 designates a spring-pawl carried in the standard $7^a$, which engages the toothed edge of the rotary cheese-carrier 5, and 18 is a hold-back pawl, which also engages the said edge, as shown.

19 designates a pointer on the swinging guide-carrier, the purpose of which will presently appear.

The knife-blade 20 is held to move vertically through the cheese, and its inner end engages and is held to slide in a vertical groove $4^c$ in the member 4. The outer end of the blade has a heel-block $20^a$, held to slide in the slotted standard $7^a$, and the upper outer edge of the said block has apertured ears $20^b$, in which is pivotally held the lower end of the toggle or link members 21, the upper ends of which are pivotally connected to the sliding head 22, which forms a part of the operating-handle, said head being also held to slide in the slotted standard $7^a$, it also being held to oscillate therein, and for such purpose the outer end of the head has rocker-bearing shoulders 23 to engage the outer edges of the standard $7^a$, as shown. The inner end of the head 22 carries a pivoted pawl 24, which projects upward and engages the rack-faces $7^f$ of the standard $7^a$.

By providing the knife holding and operating means as described the blade can be forced down by leverage-power by simply oscillating the handle 25 so its pawl will engage with the rack-faces of the standard. To lift the blade, the head of the handle is adjusted to hold the pawl disengaged from the rack-faces, and when thus held the head, together with the blade, can be quickly slid upward.

Now comes an important part of my invention—the means for setting the spacing-gages to predetermined positions, governed by the size of the gross value of the cheese to be cut up into slices of desired value.

26 denotes an annular metal rim projected up from the base to surround the cheese-carrier. Secured to the inner side of the rim 26 at the front or knife-handle side is an inwardly-projecting horizontally-disposed segmental flange 27, which carries a series of vertically-projecting and parallel segmental flanges 28, between which a series of segmental channels or guideways 29 are formed, five of said channels being shown in the drawings.

In each of the guideways 29 is held for longitudinal movement a gage-plate 30. These plates are concentrically arranged and held to slide longitudinally within their guide-channels and independently of each other, and for such purpose they are operated by suitable gear mechanism, which in turn is operated by the finger or winged nut 35. Each of the plates 30 carries at one end an indicator upon which is expressed a given amount. For example, the inner one of the plates 30 has a five-cent indicator, the next plate a ten-cent indicator, the next indicating fifteen cents, the next twenty, and the outermost one is a twenty-five-cent indicator.

It should be here stated that in setting the plates 30 they are to move together; but the gear devices for operating them (each is set in motion by manipulating the finger member 35) are so arranged to impart a differential movement to the entire series of plates 30, whereby when the inner plate shall reach the limit of its predetermined movement the next plate will have covered twice the distance, the third plate three times the distance, and the fifth plate five times the distance.

The gear mechanism for imparting a differential but synchronous movement to the several gage plates or slides may be in the nature of a train of gears of suitable diameter and held to intermesh with each other, as illustrated in Fig. 8; but for compactness and economy in construction I provide a single shaft 40, upon the outer end of which is fixedly secured the winged or turning nut, hereinbefore referred to. The shaft 40 extends transversely of the indicator slide-plates, and upon the said shaft is fixedly held a series of cog-wheels 42, 43, 44, 45, and 46, the ones 43, 44, 45, and 46 being, respectively, two, three, four, and five times the diameter of the wheel 1 plus proportion of the difference in the diameter or circle of the several slides which each one controls, the several cog-wheels engaging the under or rack faces of the several slides, as clearly shown in Fig. 11. One of the gage-slides also engages with a cog-gear 48, held on the shaft 49, that carries on its outer end a pointer 50, which moves over the dial 51, upon which is indicated different prices representing the value of different sizes of cheese.

Having thus described the detailed construction of my improvement, the manner of its operation is best explained as follows: Assuming the price of cheese to be twenty cents a pound and the whole cheese to weigh fifteen pounds, the gross value of the cheese is then three dollars and the cheese is divisible into sixty five-cent slices. The price of the cheese being known, the operator manipulating the winged or finger nut turns the train of gears, and thereby shifts the gage-slides outward until the pointer over the dial registers with the "$3.00" mark thereon. The gear devices having a predetermined movement during such operation, the several gage-slides are now so disposed relatively to each other and the cheese that the five-cent slide will extend from a given or normal line one-sixtieth the circumference of the cheese, the ten-cent gage one-thirtieth, the fifteen-cent gage one-twentieth, and the twenty-five-cent gage one-twelfth the distance of the circumference of the cheese.

The cheese after being properly weighed is placed upon a rotary carrier and centered by the centering devices, hereinbefore fully described, and held in a true position by the center-rod and guide member 4. The carrier, with the cheese, is then temporarily held from turning by means of a detent device (illustrated in detail in Fig. 14) consisting of a short rod 52, having its opposite ends bent, as at $52^a$ $52^b$. One end $52^a$ of the rod is made to engage an apertured ear 53, (see Fig. 5,) forming a part of the upwardly-projecting rim-wheel. The other end $52^b$ of the said rod engages a socket 55 in the top of the cheese-carrier. The cheese being thus held from turning, a radial cut is made by working the knife down through it, it being understood that the knife at this time is at its innermost or normal position. The initial cut having thus been made, the end $52^a$ of the rod 52 is disengaged from the ear 53 and the said end is fitted into a second socket 53 in the top of the carrier, held in a radial line with the socket 54. 57 designates a clamp member suitably held upon the rod 52 and adjustably secured thereon by means of serrations $52^\times$. The clamp member 57 after the cheese has received its initial cut is held against the forward free edge thereof to clamp the said end and hold it in a proper position. Now, assuming that the purchaser wants five cents' worth of cheese, the knife-carrier is swung to the left until its pointer 19 comes into register with the gage-plate having an indicator 5, (see Fig. 1,) after which the slice is cut by properly manipulating the knife, and after the cheese-slice is removed the knife-carrier is swung back to the right to its normal position. (Shown in Fig. 1.) The pawl 17 at this time engages the toothed edge of the carrier and rotates the said carrier forward a distance equal to one-sixtieth of a complete revolution, it being manifest that had the cut been for a twenty-five-cent slice the rotation of the carrier when the knife is swung back to its normal position would have been five times as great, or one-twelfth of a complete rotation.

From the foregoing, taken in connection with the accompanying drawings, it is thought the advantages of my invention will be readily apparent. One of the advantages is that the appliance can be quickly set to cut slices of a predetermined value accurately from cheeses of different gross values. Thus should the cheese be worth two dollars and fifty cents instead of three dollars, as before stated, the winged nut would be turned only until the pointer is over the "$2.50" mark upon the dial. The several gage-slides during such manipulation of the winged nut and the carrier operating thereby would be so set that the difference in the spaces between them would be one-fiftieth of the entire circumference of the rim held coincident to the circumference of the cheese.

By providing a slidable clamp to engage the outer cut edge of the cheese said clamp can be readily slid backward or forward, so as to properly engage with cheeses of different diameters, thereby materially aiding in holding the cheese in a proper position until it has been entirely cut up.

Changes in the details of construction and arrangement of the several parts can be made without departing from the scope of the appended claims, the cheese-centering devices forming an essential feature of this invention, and they coöperate with the other parts thereof, as it is very essential that the cheese be properly centered mechanically upon its carrying-base to effect an accurate cutting of the slices.

It should be stated that in the practical construction of my invention the gage-slides are made of suitable length, and the gear mechanism for setting them is correspondingly so arranged, in conjunction with the dial, that when the dial-finger 50 has made a complete revolution the gages will be set for a cheese amounting to seventy-five cents in gross value. The "$1.00" mark is one-quarter of the circle from the "75¢" mark. The "$1.50" mark is opposite the "75¢" mark, or at one-half of the circle, it being understood that as the indicating-marks progress they become closer to each other until there is practically no limit to the size of the cheese for which the gages may be set to provide for proper proportionate cuts or slices of predetermined value.

Having thus described my invention, what I claim, and desire to secure by Letters Patent, is—

1. A cheese-cutting mechanism comprising a cheese-holder; a dial upon which the gross value of the cheese is indicated, and a setting-finger movable over the dial and coöperatively connected with the slides; of a series of adjustable slides circumferentially extensible around the cheese, each slide indicating a predetermined divisional part of the cheese, and forming a gage for the line upon which to cut the cheese.

2. A cheese-cutting mechanism comprising a rotatable cheese-holder; a series of adjustable gages, each indicating a predetermined divisional part of the cheese; said gages extending circumferentially around the cheese; a swinging knife-carrier working in harmony with the said gage-slides; a knife projecting radially from the cheese and vertically slidable in the guide, the guide being connected with the cheese-carrier and adapted to rotate at a predetermined degree, when it, the knife-carrier, is returned to its normal position, as specified.

3. A cheese-cutting apparatus comprising a carrier; a dial having marks indicating the different cheese values; a series of rotatable guides, said series being movable together; and means for imparting a differential movement to the said slides, synchronously with the setting of the finger of the dial, said movement of the gage-slides being governed as to distance by the proper setting of the finger on the dial, as specified.

4. A cheese-cutting mechanism comprising a rotatable cheese-carrier; a dial upon which the values of different-sized cheese are shown; a shaft having a finger traversing said dial; a series of gage-slides movable around the circumference of the cheese, each having a predetermined value-sign; and a hand-operated gear mechanism connected with the said gage-slides and the dial-finger, adapted when properly manipulated to synchronously set the dial-finger and slides and impart differential degrees of movement to the gage-slides, for the purposes described.

5. In a cheese-cutting mechanism of the character described, a rotary cheese-holder, a dial having different values denoted thereon; a series of concentrically-held gage-slides extended partly around the peripheral edge of the cheese; a hand-operating gear mechanism, engaging said slides and adapted when rotated to distend the gage-slides to predetermined points; said gear mechanism also engaging with the index-finger of the dial, and adapted to set the same simultaneously with the adjustment of the gage-slides, as specified.

6. The combination with the rotary cheese-carrier; the dial having different cheese values denoted thereon; and the dial index-finger; of a series of concentrically-held slides, each having an independent movement and formed with a rack portion; one of the slides engaging the toothed wheel on the index-finger shaft; and a rotary shaft having an operating-handle; a series of gears mounted thereon, engaging the rack portions of the several gage-slides—one gear for each slide; said gears having progressively-increasing diameters, the smallest engaging the innermost one of the gage-slides, as specified.

7. In a cheese-cutting mechanism as described, the combination with the rotatable cheese-carrier; and a series of gage-slides for spacing the size of the cuts; of an oscillating knife-carrying frame held to swing in the arc of a circle, and in close relation to the gage-slides; a knife held for vertical reciprocation in the frame; a pawl mounted on said frame to engage the rotary carrier and move it in a forward direction as it, the knife-frame, is thus moved, substantially as shown and described.

8. In a cheese-cutting mechanism having a series of gage members for regulating the size of the cuts, and extended circumferentially around the cheese; and a rotary cheese-carrier; of a knife-carrying frame held to swing around the cheese and in close relation to the gage members; a knife vertically movable in said frame, said knife extending radially inward over the cheese; and connections joining the said frame and the carrier for moving the cheese-carrier in a forward direction, as specified.

9. In a cheese-cutting mechanism as described, the combination with the rotary carrier; the top frame, and the swinging knife-carrying frame; of the detachable center-rod 4, having a vertical groove, and the knife having a heel portion vertically movable in the frame, and having its front end held to slide in the groove of the rod 4.

10. In a cheese-cutting mechanism as described, the combination with the rotary carrier, the top frame, and the swinging knife-carrying frame; of the detachable center-rod 4, said rod having a vertical groove, the knife having a heel portion vertically movable in the frame, and its front end held to slide in the groove of the rod 4, and the detachable locking device for holding the rod to its set position, as specified.

11. The combination with the rotary carrier, the gage devices for indicating the different sizes of cuts, and the cutting mechanism; of a lever-operated means mounted upon the main frame for centering the cheese on the carrier, said means including the arms 14.

12. The combination with the rotary carrier, the gage devices, and the cutting mechanism; of the cheese-centering means comprising a series of pendent arms adapted to engage the sides of the cheese, and lever-set gear devices for moving the said arms radially inward and outward, as specified.

13. In a cheese-cutting mechanism as described; a cheese-centering means comprising a pendent hub disposed centrally over the cheese-carrier; an idler-gear loosely journaled thereon; a series of horizontally-disposed segmental gear-plates engaging the said idler-gear, said gear-plates having each a pendent member adapted to engage the sides of the cheese, one of said segmental plates having a handle, substantially as shown and described.

14. In a cheese-cutting mechanism as described, the combination with the rotary cheese-carrier, having a pair of radially-disposed sockets, and an apertured ear upon a fixed part of the supporting-frame; of the member 52, having hook ends $52^a$ $52^b$, and a clamp member slidable thereon, the rod 52, having means for holding the clamp locked at different adjustments, for the purposes described.

15. In a cheese-cutting mechanism as described, the combination with the rotary cheese-carrier, the knife-carrying frame, consisting of the upper and lower radial arms pivotally journaled to swing in the arc of a circle over the peripheral edge of the cheese, and the slotted upright connected with the radial arms, and the guide-rod 4; of the knife having a heel portion slidable in the slotted upright, a toggle-link joined to the upper face of the said heel, a slide-block with which the upper end of the toggle connects, a pawl pivoted upon the inner end of the slide-block, a handle projected rearwardly from the block, a slotted upright having ratchets with which the pawl engages, all being arranged substantially as shown and described.

PHILIP S. McCROSKEY.

Witnesses:
T. M. SULLIVAN,
O. P. PENNINGTON.